(12) United States Patent
Zhu

(10) Patent No.: US 6,462,791 B1
(45) Date of Patent: Oct. 8, 2002

(54) CONSTRAINED MOTION ESTIMATION AND COMPENSATION FOR PACKET LOSS RESILIENCY IN STANDARD BASED CODEC

(75) Inventor: Chunrong Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/884,784

(22) Filed: Jun. 30, 1997

(51) Int. Cl.[7] ............................. G06T 7/20; H04N 7/36
(52) U.S. Cl. ..................... 348/845.1; 348/416; 348/699
(58) Field of Search ................................. 348/416, 423, 348/845.1, 699; H04N 7/36

(56) References Cited

U.S. PATENT DOCUMENTS 5,475,688 A * 12/1995 Bridgewater ................ 370/394
5,528,284 A * 6/1996 Iwami ......................... 348/13
5,613,003 A * 3/1997 Bridgewater ................ 348/384
5,742,623 A * 4/1998 Nuber ......................... 714/818
5,802,063 A * 9/1998 Deiss .......................... 348/426

\* cited by examiner

Primary Examiner—Howard Britton
(74) Attorney, Agent, or Firm—Blakely, Sokoloff, Taylor & Zafman LLP

(57) ABSTRACT

The present invention discloses a method and apparatus for transmitting a plurality of images of at least over a packet network. A plurality of motion vectors based on at least one moving object is generated. The plurality of images is encoded by constraining the plurality of motion vectors so as to produce a bitstream. The bitstream is then transmitted over the packet network.

23 Claims, 8 Drawing Sheets

CONSTRAINED MOTION ESTIMATION AND COMPENSATION FOR PACKET LOSS RESILIENCY IN STANDARD BASED CODEC

BACKGROUND OF THE INVENTION

1. Field of the Invention

This invention relates to the field of video encoding and decoding. In particular, the invention relates to constrained motion estimation and compensation for packet loss resiliency.

2. Description of Related Art

The techniques of video motion estimation, compensation and prediction are used in the encoding and decoding of video data involving motion to increase the compression rate of the video data. There are a number of techniques and standards for video compression. Examples of these techniques and standards include: the Motion Joint Picture Experts Group (JPEG), the wavelets, the International Telecommunications Union (ITU), the H.261/H.263 video codec, and the Motion Picture Experts Group (MPEG) standards. Due to high compression rates, the ITU H.261/H.263 and MPEG-1, MPEG-2 standards are popular in applications involving real-time video telecommunication and video conferencing.

In the H.261/H.263 and MPEG-1, MPEG-2 standards, compression is performed on both intraframes and interframes of data. Interframe compression is the major compression technique used for compressing video data involving moving objects. Interframe compression removes temporal redundancy from successive frames rather than from single frames by encoding the difference between frames. For example, in MPEG compression, block-based motion compensation is employed to reduce temporal redundancy inherent in video motion sequences. Motion compensation is used for both the causal prediction of a current picture from a previous picture, and for non-causal, interpolative prediction from past to future pictures. Two-dimensional motion vectors are used to provide offsets used in previous or upcoming frames whose pixel values have already been stored. These two-dimensional motion-vectors, and the associated error difference signals are then applied back to the previous or following frames in the decoding process to recover the original data.

Essentially, motion compensation involves the use of motion vectors to improve the efficiency of the prediction of pixel values. Both the encoder and decoder in a video compression system are responsible for handling motion compensation. The process of determining the values of the motion vectors for each frame is called motion estimation. In motion compensation, the image is arbitrarily divided into macroblock ("MB") regions. To determine motion vectors (from the previous frame to current frame), a MB in the current frame is compared with the MBs in the search area in the previous frame (which serves as a reference frame). The motion vector is obtained at the location of the MB in the search area that provides the best match, based on some predefined criteria.

In addition to motion compensation, most video compression systems employ additional processing steps such as transformation, quantization and statistical encoding. A popular transform technique is the Discrete Cosine Transform (DCT). A popular quantization method is scalar quantization. An example of statistical codes used for encoding is the variable length Huffman code.

As an example, the H.261/H.263 video encoder combines intraframe and interframe coding to provide fast processing for on-the-fly video. The algorithm creates two types of frames:

(1) DCT-based intraframes without motion compensation, and
(2) predictive interframes using motion estimation and compensation.

The H.261/H.263 encoder is shown in FIG. 1. The H.261/H.263 video decoder is shown in FIG. 2. It consists of a receiver buffer 52, a VLC decoder 55, an inverse quantizer 60, an inverse DCT 62, an adder 65, and a motion compensator 80, which includes frame memory and an optional loop filter 70. The H.261/H.263 coding process begins by coding an intraframe block, which is then sent to a video multiplex coder. Upon receipt, the same frame is decompressed using the inverse quantizer 20 and inverse DCT 22, and then stored in the frame memory 30 for interframe coding.

During interframe coding, the prediction is used to compare every macro block of the actual frame with the available micro blocks of the previous frame. This is done by a motion estimator 33 and motion compensator 34. To reduce the encoding delay, only the closest previous frame is used for prediction. This is accomplished by subtracting a predictive frame from the image by a subtractor 12. Then, the difference, creates as error terms, is DCT-coded and quantized, and sent to the video multiplex coder with or without the motion vector. At the final step, variable-length coding (VLC), such as Huffman encoder 40, is used to produce more compact code. An optional loop filter 35 can be used to minimize the prediction error by smoothing the pixels in the previous frame. At least one in every 132 frames is intraframe coded.

One major problem in such typical video compression systems is the presence of channel errors or packet losses. Packet losses result in the creation of a corrupted bitstream that is not decodable. In addition, errors may propagate resulting in incorrect decoding of variable or fixed-length codes. If the system is not carefully designed, the errors will result in the provision of unacceptable image quality.

Conventional solutions to the packet loss problem involve one of two approaches: (1) avoiding motion compensation and (2) packet loss recovery. These conventional solutions have a number of drawbacks.

Avoiding motion compensation eliminates the use of motion compensation altogether. However, other forms of non-motion compression are required. An example is motion JPEG where compression is only performed intraframe, not interframe. The major drawback of this solution is a reduced compression rate. The typical compression rate for motion JPEG is 10:1 as opposed to compression rates as high as 200:1 for H.261/H.263 MPEG.

Packet loss recovery techniques reduce the effect of packet loss by introducing additional information. Some examples of packet loss recovery techniques include (i) increasing the frequency of sending the Interpolation frames or Intra MBs, and (ii) providing feedback of DCT coefficients at the encoder. However, these techniques in packet loss recovery do not provide consistent results. Such inconsistent performance results in the provision of random motion vectors so that compression from and/or prediction of the lost motion vectors are not reliable.

Accordingly, there is a need in the technology to provide an apparatus and method for motion estimation and compensation for high compression rates, which maintains packet loss resiliency.

SUMMARY OF THE INVENTION

The present invention discloses a method and apparatus for transmitting a plurality of images of at least one moving object over a packet network. A plurality of motion vectors based on at least one moving object is generated. The plurality of images is encoded by constraining the plurality of motion vectors so as to produce a bitstream. The bitstream is then transmitted over the packet network.

BRIEF DESCRIPTION OF THE DRAWINGS

The features and advantages of the present invention will become apparent from the following detailed description of the present invention in which.

DESCRIPTION OF THE PRESENT INVENTION

The present invention discloses a method and apparatus for transmitting images using constrained motion estimation and motion compensation. In particular, the present invention provides motion estimation, by first selecting the best matching orientation for each region in the image based on the majority voting of the motion vectors. Next, the motion vectors are encoded based on these locally best matched vectors. The resulting output is transmitted via a communication medium and received by a decoder, which provides motion compensation, by recovering the motion vectors for lost packets based on the neighboring vectors. Through the implementation of the present invention, a high compression rate with motion compensation and packet loss resiliency is provided.

Figure 1:
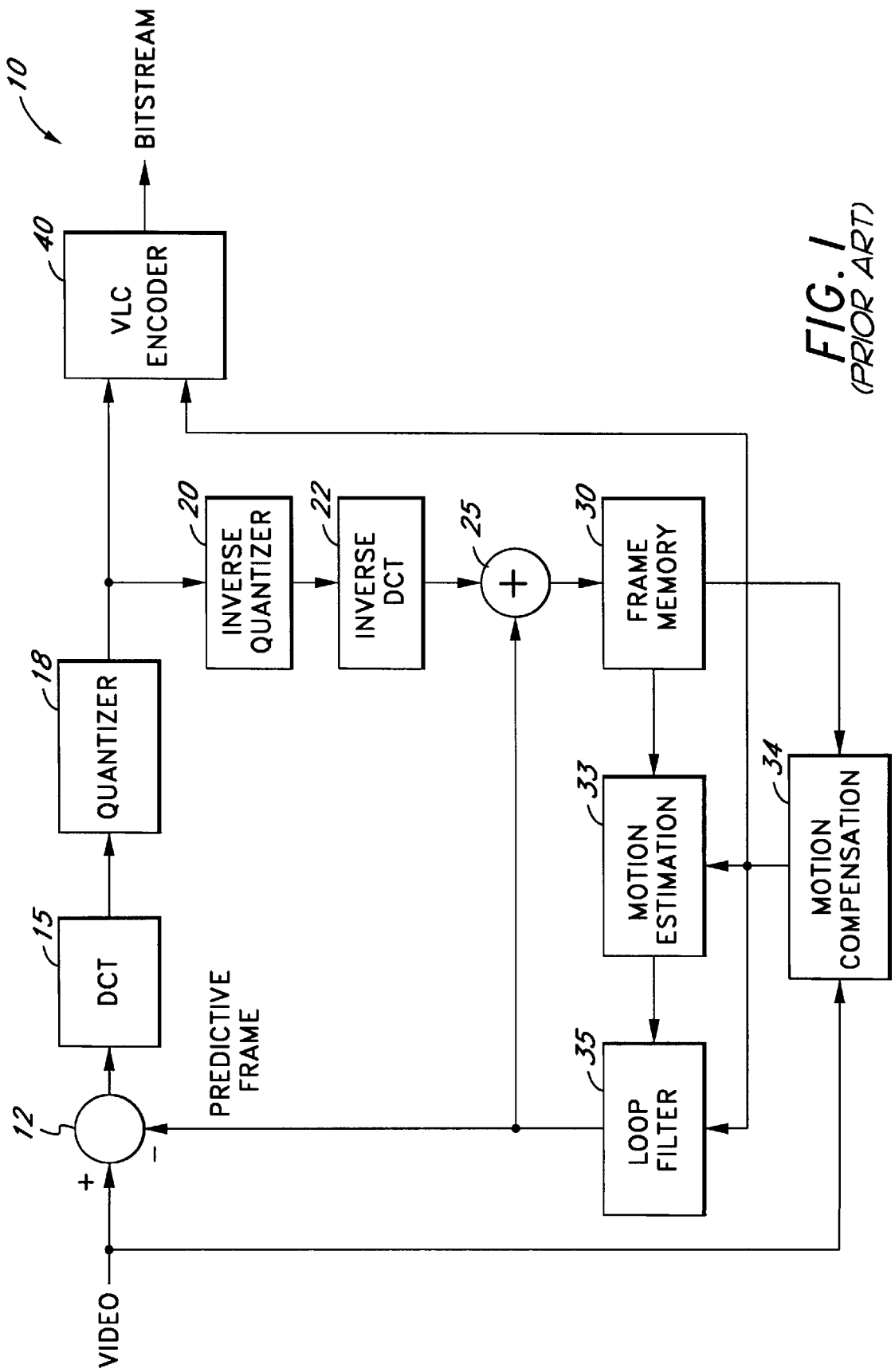
FIG. 1 is a block diagram illustration of the prior art encoder.
Figure 2:
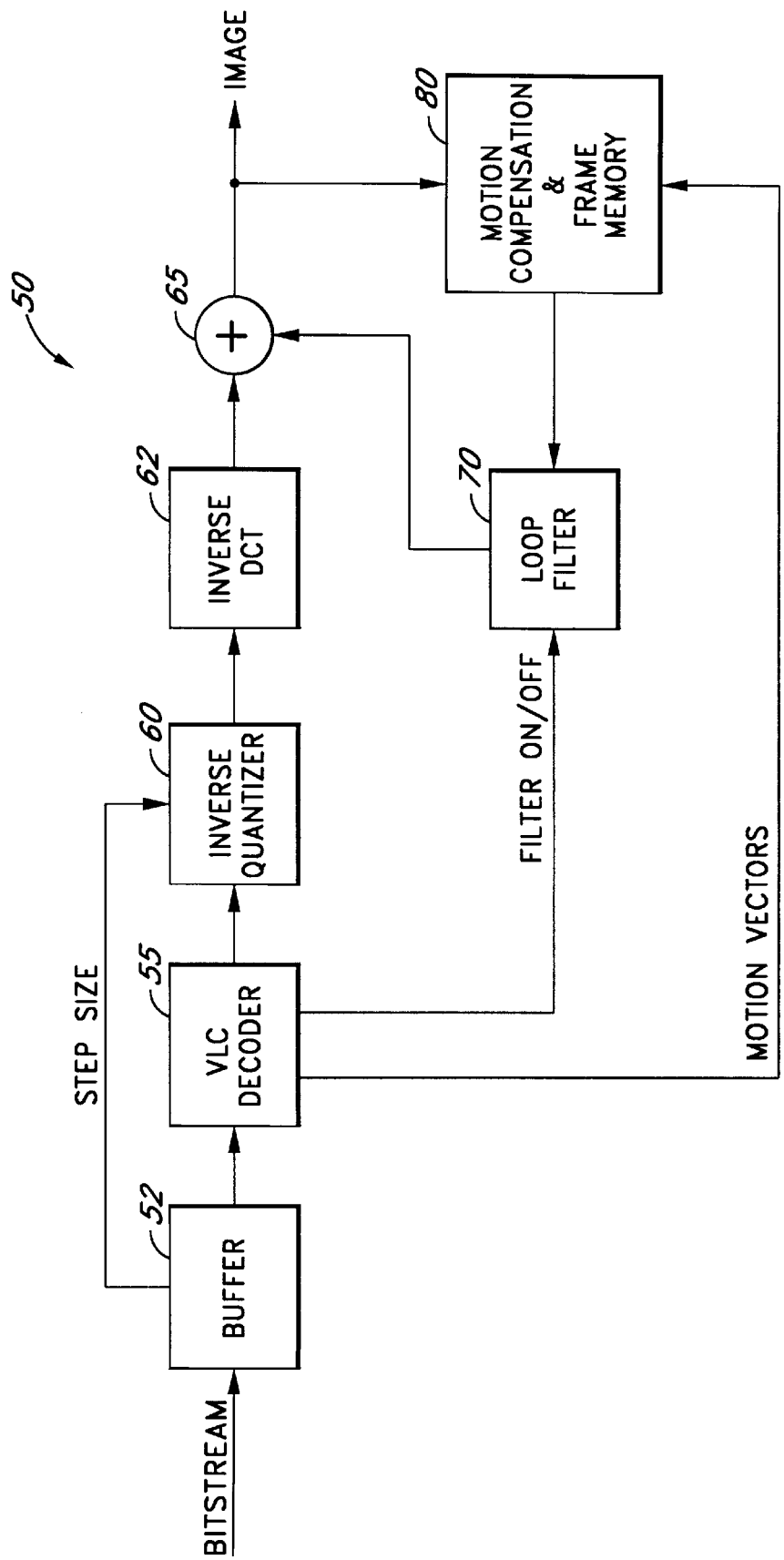
FIG. 2 is a block diagram illustration of the prior art decoder.
Figure 3:
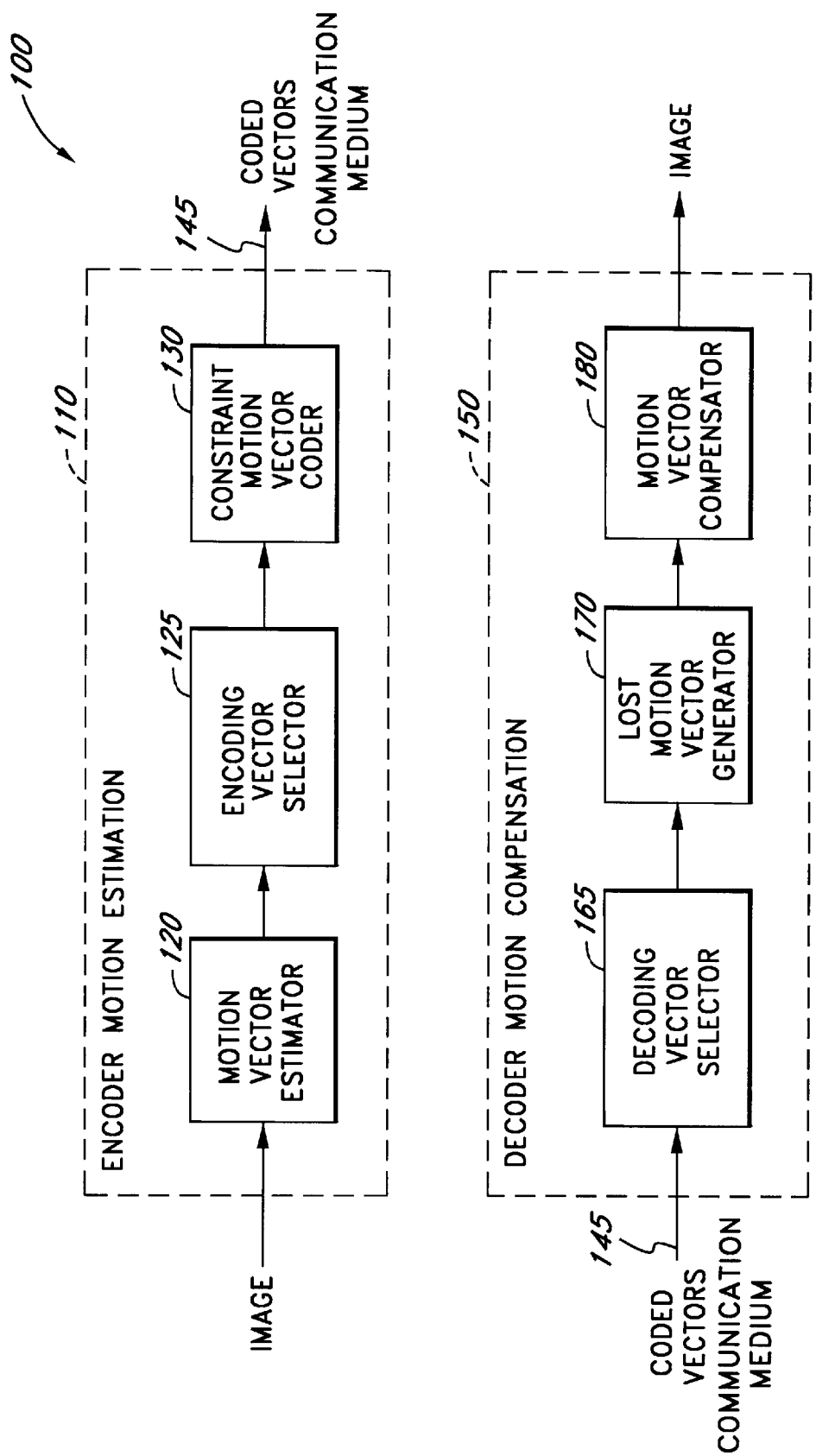
FIG. 3 is a block diagram illustration of one embodiment of a system that operates in accordance with the teachings of the present invention.

Referring to FIG. 3, a block diagram illustrating one embodiment of a video system 100 utilizing the teachings of the present invention is shown. The video system 100 comprises an encoder motion estimator 110 which computes the motion vectors, and decoder motion compensator 150 to compensate the motion.

In the following description, the encoder motion estimator 110 and the decoder motion compensator 150 are described in terms of block diagrams. It is apparent to one of ordinary skill in the art that the functions represented in the block diagrams may be implemented by a number of techniques. For example, the functions represented may be implemented by instruction requests stored in memory and executed by a processor. Alternatively, the encoder motion estimator 110 and/or decoder motion compensator 150 may be implemented using hardware circuitry.

With references in FIG. 3, encoder motion estimator 110 comprises a Motion Vector Estimator 120, an Encoding Vector Selector 125, and a Constraint Motion Vector Coder 130. Video images are first provided to the Motion Vector Estimator 120 which performs the motion vector estimation. Encoding Vector Selector 125 selects the best matching motion vectors representative of local regions. Constraint Motion Vector Coder 130 encodes the motion vectors according to these best matching motion vectors.

The encoded motion vectors are provided to the decoder along with encoded video data via a communication medium 145. In one embodiment, the communication channel 145 is a communication ink such as a satellite, a microwave link, a radio frequency (RF) link, a fiber optical link, or a telephone link. However, it is apparent to one of ordinary skill in the art that communication medium 145 may be any appropriate communication channel that transmits the bitstream.

The encoded motion vectors are received by decoder motion compensator 150. Decoder motion compensator 150 comprises a Decoding Vector Selector 165 and a Lost Motion Vector Generator 170 and a Motion Vector Compensator 180. The Decoding Vector Selector 165 receives the encoded motion vectors and selects the best matching motion vectors representative of the local regions containing the lost packets. Lost Motion Vector Generator 170 generates the motion vectors of the lost packets. Motion Vector Compensator 180 performs motion compensation to produce the image.

Figure 4:
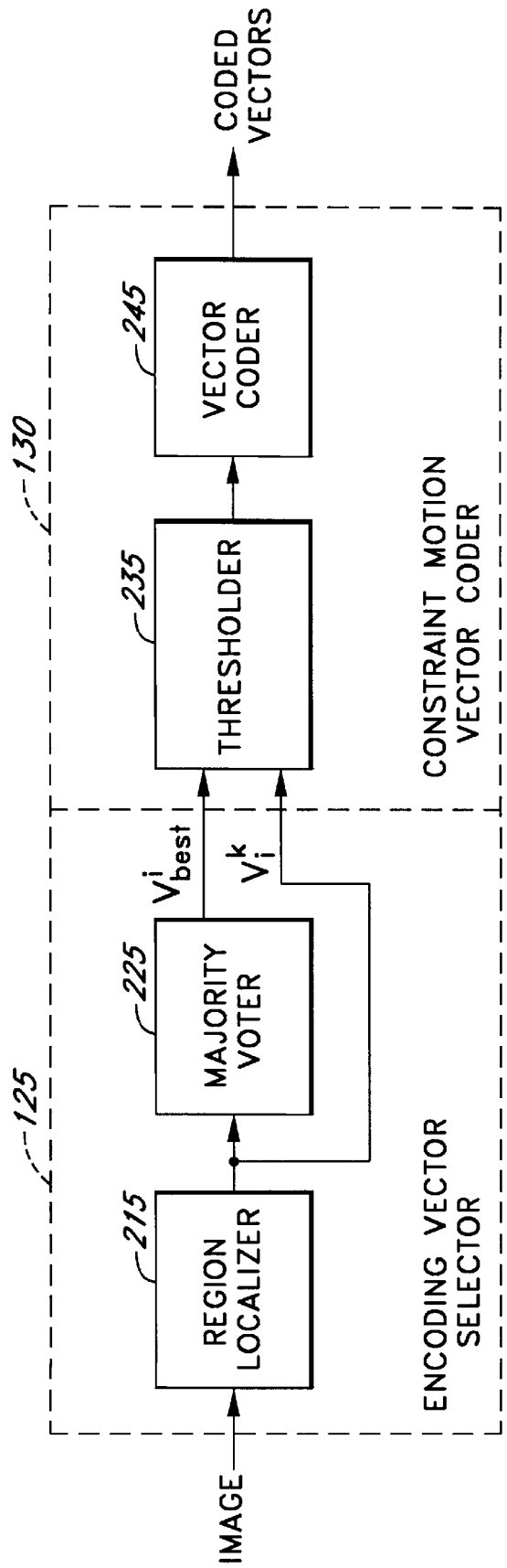
FIG. 4 is a block diagram illustration of one embodiment of the constrained motion estimation.

Referring to FIG. 4, a diagram illustrating one embodiment of the Encoding Vector Selector 125 of FIG. 3 and one embodiment of the Constraint Motion Vector Coder 130 of FIG. 3 are shown. Encoding Vector Selector 125 comprises a Region Localizer 215 and a Majority Voter 225. Region Localizer 215 collects all the motion vectors $V^i_k$ (i is the vector index and k is the region index) within a region which consists of a group of macroblocks (MBs). Majority Voter 225 scans through all the motion vectors in the region R to pick the motion vector that is the most representative in the region R. This process is described in detail below. Such a motion vector is referred to as the best matching vector $V^i_{best}$.

Constraint Motion Vector Coder 130 comprises a Thresholder 235 and a Vector Coder 245. Thresholder 235 compares the difference between the motion vectors $V^i_k$ in region R and the best matching vector $V^i_{best}$ with a predetermined threshold T. Vector Coder 245 codes the motion vectors $V^i_k$ according to the result of the thresholding as described later.

Figure 5:
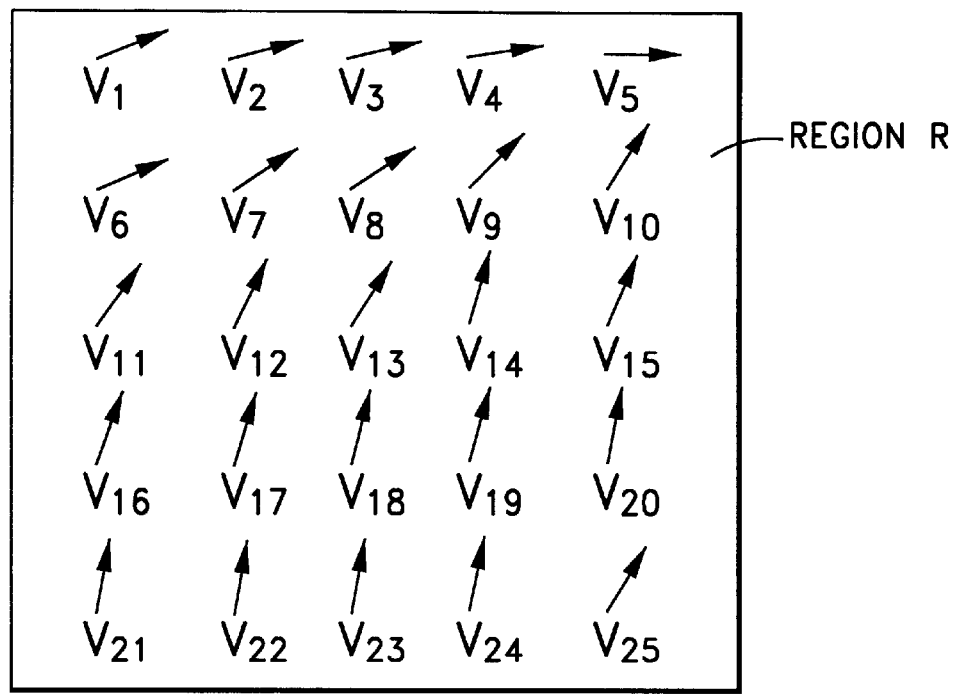
FIG. 5 is an illustration of the constrained motion estimation for a region R.
Figure 5:
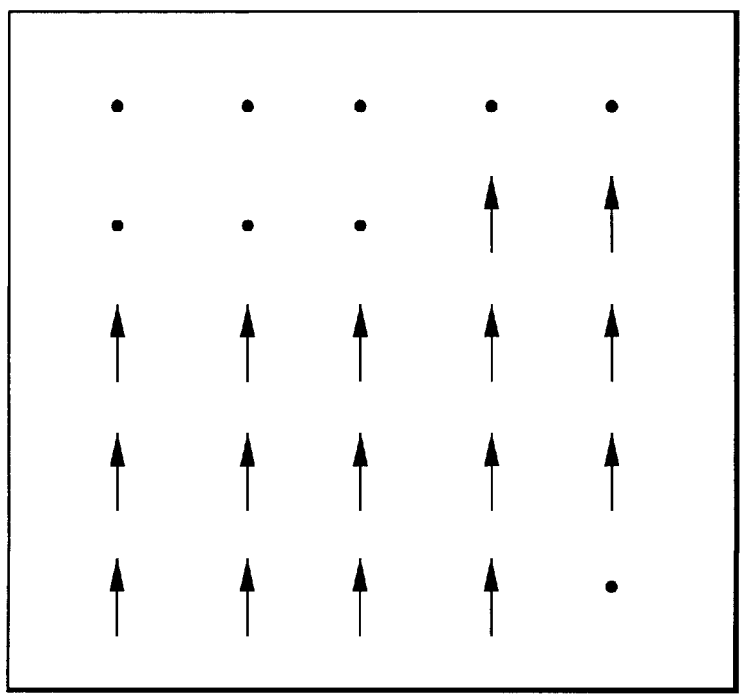

FIG. 5 is a diagram illustrating the process of selecting motion vectors as performed by the Encoding Vector Selector 125, in accordance with the teachings of the present invention. As shown, region R comprises a group of macroblocks (MBs). For illustrative purposes, only 5×5 motion vectors are shown for a total of 25 vectors. The constrained motion estimation process proceeds as follows:

Step 1: Select the motion orientation $A_{best}$ that is the best match or most representative orientation for the entire region R. This can be achieved by taking the average of all the orientation angles, or the directions, of all the motion vectors. Alternatively, the best matching motion orientation $A_{best}$ can be selected by a simple majority voting process.

Step 2: Determine the absolute difference $D_A = Abs\{A(V_i) - A_{best}\}$, where $A(V_i)$ is the orientation of the motion vector $V_i$ and i is the index of the motion vectors in region R.

Step 3: Constrain the motion vectors to one of the two orientations: (1) no motion (i.e., zero motion vector), and (2) the selected best orientation, $A_{best}$. If the absolute difference $D_A$ between the two orientation angles exceeds some predefined threshold $T_A$, the motion vector is set to zero. If the absolute difference $D_A$ is less than $T_A$, the orientation of the motion vector $V_i$ is set to $A_{best}$.

For the example shown in FIG. 5, the average of all the orientation angles is close to the vertical line, i.e., the orientation angle is 90 degrees. $A_{best}$ is therefore set as 90 degrees. From the 25 motion vectors $V_i$ (i=1, . . . , 25), the motion vectors $V_1$, $V_2$, $V_3$, $V_4$, $V_5$, $V_6$, $V_7$, $V_8$, and $V_{25}$ have orientation angles markedly different than the vertical line. Therefore, these motion vectors are set to zero. The orientation angles of the remaining motion vectors are set to be 90 degrees.

In another embodiment, the best matching vector $V_{best}$ is obtained by taking the average of the orientation angles and the average of the magnitudes of all the motion vectors in region R. Alternatively, $V_{best}$ can be obtained by using a majority voting process. A simple majority process will be described later. Thereafter, the angle difference $D_A$ and the magnitude difference $D_M$ between the motion vectors $V_i$ and the best matching vector $V_{best}$ are computed.

The constraint process works as follows:

If $D_A > T_A$ or $D_M > T_M$: set $V_i = 0$.

If $DA < T_A$ and $DM < T_M$: set $V_i = V_{best}$

In another embodiment, the orientation angle is selected to be one of zero degree (horizontal forward), 90 degrees (vertical upward), 180 degrees (horizontal backward), or 270 degrees (vertical downward).

After the selection step, a new set of motion vectors is created. This set of vectors represents the constraint motion estimation.

Figure 6:
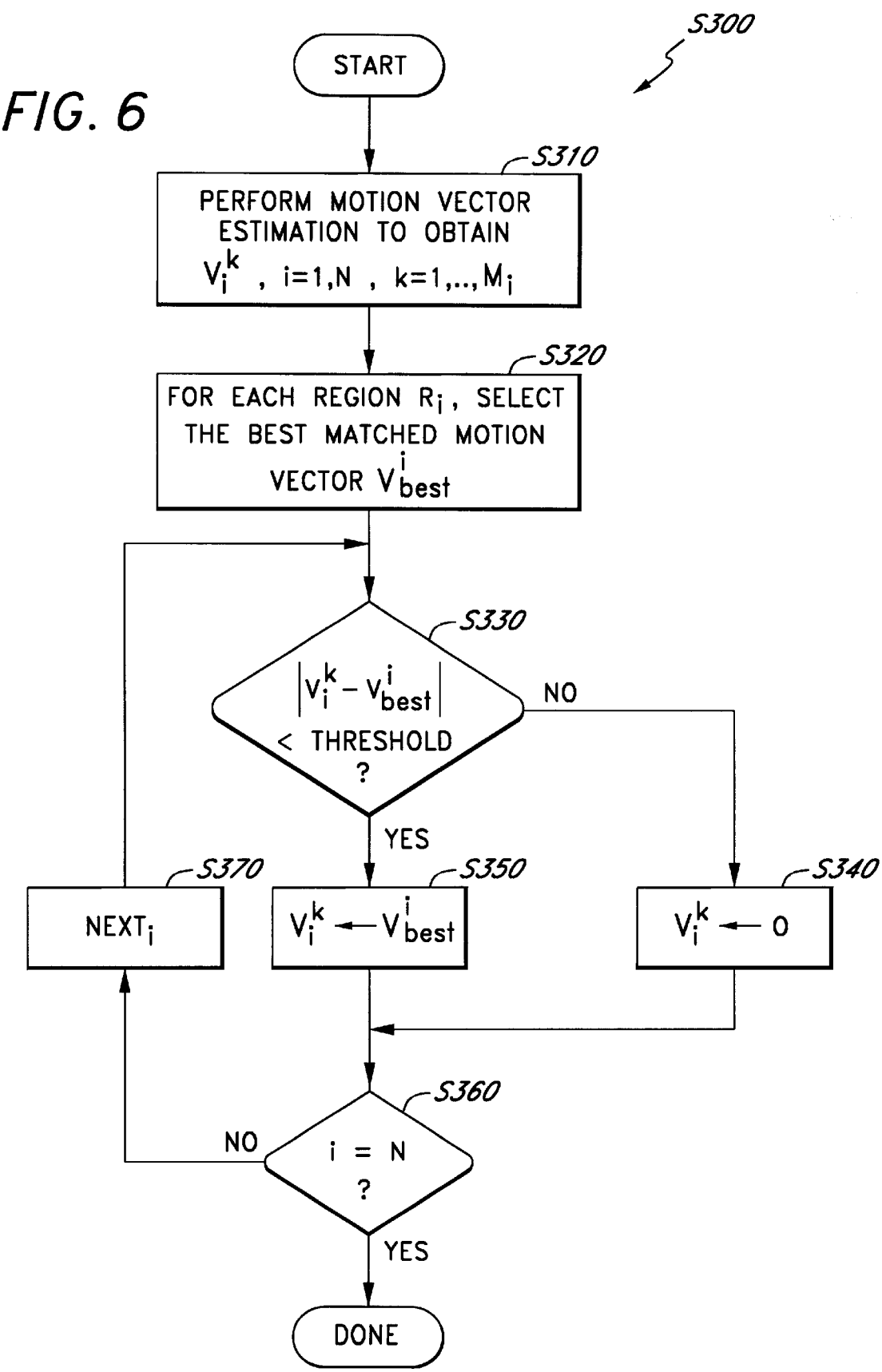
FIG. 6 is a flowchart illustrative of one embodiment of the encoder motion estimation process.

FIG. 6 is a flowchart illustrating the encoder motion estimation process S300 as performed by Encoder Motion Estimator 110 (FIG. 3). The process S300 proceeds from a START state and proceeds to step S310 where it performs motion vector estimation. The motion vector estimation is carried out using standard motion estimation technique. Step S310 will generate motion vectors $V^k_i$ where i=1, . . . , N and k=1, . . . , $M_i$, N is the number of regions in the image, $M_i$ is the number of vectors in the region i.

Process S300 then proceeds to step S320. In step S320, the best matching vector $V^i_{best}$ is obtained for each region $R_i$. This can be done by computing the average of all motion vectors or using the majority voting process in region $R_i$. After $V^i_{best}$ is obtained, process S300 proceeds to the decision step S330. Each motion vector is compared to the best matching vector $V^i_{best}$ for orientation angle, or magnitude, or both. For simplicity, in the box shown for S330, only one comparison is shown. This comparison can be performed by comparing the absolute difference between each motion vector and $V^i_{best}$ to a predetermined threshold value. If the absolute difference is greater than the threshold, the motion vector $V^k_i$ is set to zero (Step S340). If the absolute difference is less than or equal to the threshold, the motion vector $V^k_i$ is set to $V^i_{best}$ (Step S350). In another embodiment, if the absolute difference is less than or equal to the threshold, only the orientation angle of the motion vector $V^k_i$ is set to that of the $V^i_{best}$, while its magnitude remains the same.

Process S300 then advances to decision step S360 to determine if all regions have been processed. If not, the next region i is examined (Step S370), and control returns back to step S320. If all regions have been processed, process S300 is terminated.

Figure 7:
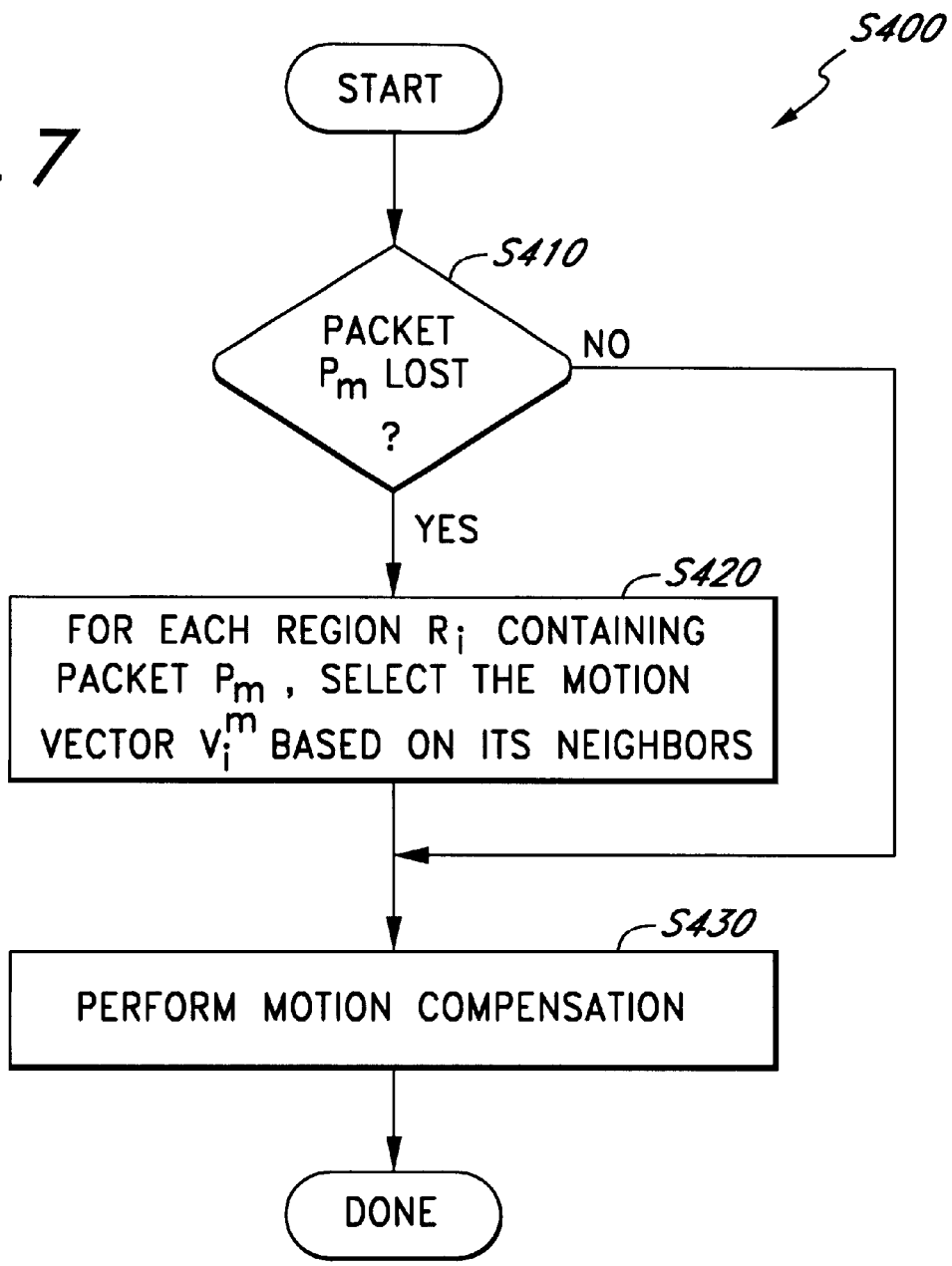
FIG. 7 is a flowchart illustrative of one embodiment of the decoder motion compensation process.

Referring to FIG. 7, a flowchart illustrating the decoder motion compensation process S300 as performed by decoder motion compensator 150 (FIG. 3) is shown. Advancing for the START state, the decision step S410 determines if a packet loss has occurred for packet $P_m$ where m is the packet index. If there is no packet loss, the decoding process proceeds to step S430 to perform motion compensation. If there is packet lose, process S300 proceeds to step S420. At step 420, the motion vector for the lost packet is estimated. This motion vector $V^i_m$ for the lost packet is estimated by using the same selection process as in the encoder, assuming the motion vector for the lost packet is zero. After the motion vector of the lost packet is estimated, process S400 proceeds to step S430 to perform the standard motion compensation. Thereafter, the decoding process is terminated.

In another embodiment of the encoding and decoding process, the selection of the best matching motion vector is carried out using a profile-based estimation. The profile-based estimation selects the best matching motion vector based on the history (e.g., profile) of the motion vectors in the most recent frames.

Figure 8:
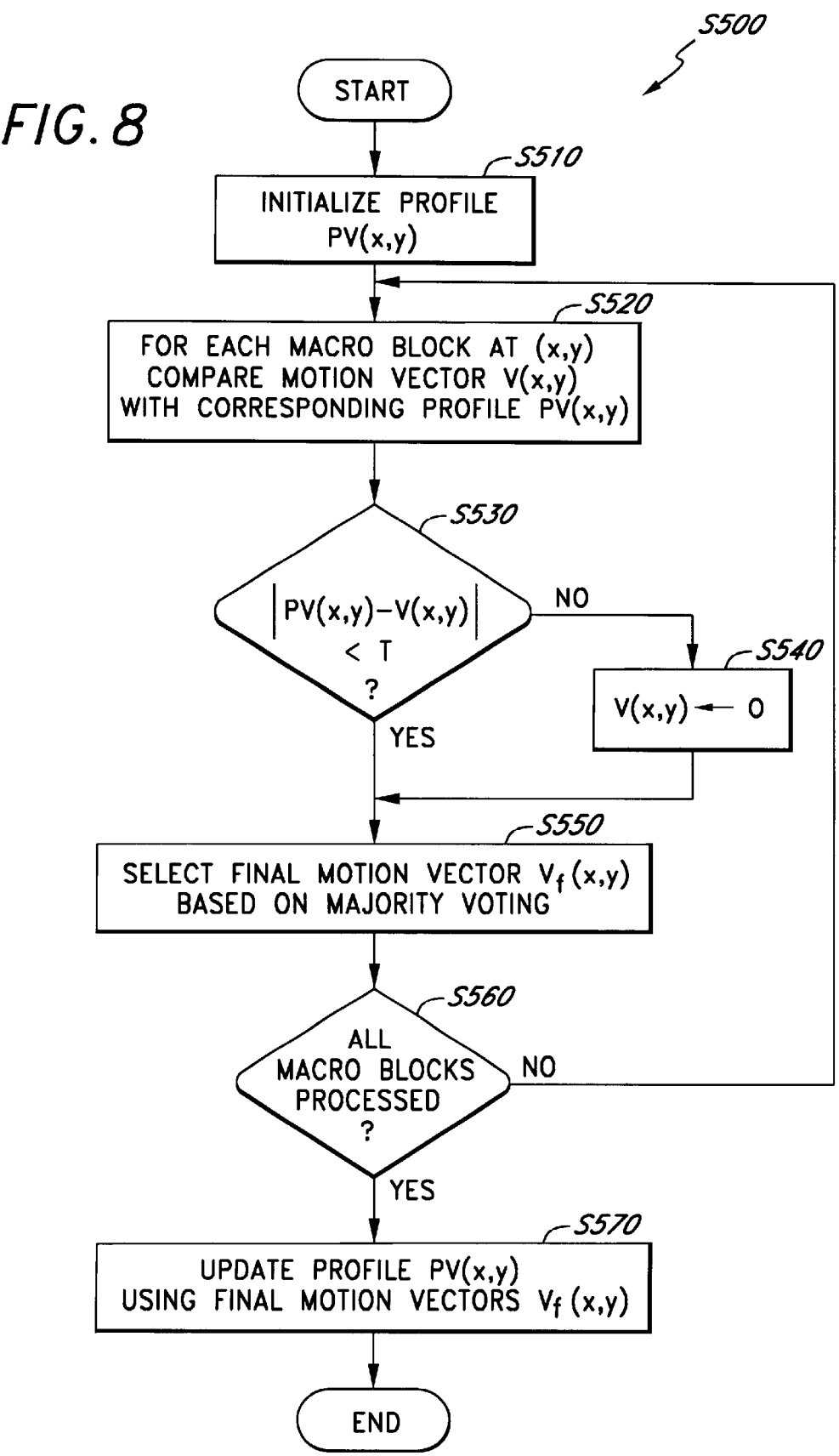
FIG. 8 is a flowchart illustrative of one embodiment of the profile-based constraint motion estimation.

FIG. 8 is a flowchart illustrating the profile-based estimation process of the present invention as performed by the encoder motion estimator 110 and similarly by decoder motion compensator 150. Proceeding from a START state, process S500 proceeds to step 510 where it initializes the vector profile PV(x,y). The vector profile PV(x,y) stores the profile of the motion based on the motion vectors used in the most recent frames. This vector profile keeps and updates the history of the motion of the macroblocks in the images. At the very beginning, the profile PV(x,y) may simply be the motion vectors of the first frame. Thereafter, process S500 proceeds to step S520. At step S520, each motion vector V(x,y) at the macroblock at (x,y) is compared with the corresponding vector profile PV(x,y). At the decision step S530, the absolute difference between the motion vector V(x,y) and the corresponding vector profile PV(x,y) is compared with a predefined threshold T. For simplicity, only one comparison is shown.

Normally, the comparison is performed for both the direction and magnitude components of the motion vector. If the absolute difference is not less than the threshold T, i.e., the motion vector V(x,y) is markedly different than the corresponding profile PV(x,y), then the motion vector V(x,y) is set to zero (Step S540). Otherwise, or after V(x,y) is set to zero in step S540, the final motion vector $V_f(x,y)$ is selected (Step 550). The selection of $V_f(x,y)$ can be performed in a number of ways. One way to select $V_f(x,y)$ based on the majority voting of the local neighborhood of V(x,y) is described in detail below. The majority voting process proceeds/operates as follows: First, assume or define $V_i$ as the motion vectors in the neighborhood being considered. The size of a typical neighborhood is 8×8. Next, classify $V_i$'s into groups of similar vectors. The similarity measure may be related to orientation, or magnitude, or both. The classification can be any well known technique in pattern recognition such as k nearest neighbor (kNN) or ISODATA. Alternatively, if these motion vectors have been properly quantized (in both orientation and magnitude), the motion vectors may be classified into groups of identical vectors based on a predefined measure (e.g. orientation angle, or magnitude, or both). The best matching motion vector is then selected as the representative vector of the group having the most similar vectors. It should be noted that the decoder motion compensator uses the same selection process as used by the encoder motion estimator. If V(x,y) has been set to zero before, it may be replaced by the majority vector. In the voting, ties are resolved by random selection.

Process S500 proceeds to decision step S560 to determine if all macroblocks have been processed. If not, process S500 returns to step S520 to repeat the same process. If all macroblocks have been processed, the vector profile PV(x,y) is updated using the final motion vectors $V_f(x,y)$'s (Step S570). Process S500 is then terminated.

The constrained motion estimation and compensation techniques described in the present invention provide an accurate determination of motion vectors in lost packets without causing unacceptable errors, while maintaining the fast processing of the motion characteristics of images of moving objects. The profile-based motion estimation provides further reliable estimation by keeping track the motion history.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   generating a plurality of motion vectors based on at least one moving object;
   encoding a plurality of images of said at least one moving object by constraining said plurality of motion vectors to produce a bitstream; and
   transmitting said bitstream over a packet network.

2. The method of claim 1 wherein encoding comprises estimating said plurality of motion vectors prior to constraining.

3. The method of claim 1 wherein constraining comprises:
   determining a best matching motion vector representative of said plurality of motion vectors in an image region;
   setting one of said plurality of motion vectors to a first vector if said one of said plurality of motion vectors is not sufficiently similar to said best matching motion vector; and
   setting one of said plurality of motion vectors to a second vector if said one of said plurality of motion vectors is sufficiently similar to said best matching motion vector.

4. The method of claim 3 wherein determining said best matching motion vector computes a best matching orientation angle and a best matching magnitude.

5. The method of claim 3 wherein said first vector is a zero vector.

6. The method of claim 3 wherein said second vector is said best matching vector.

7. The method of claim 3 wherein the best matching motion vector is determined by computing an average of vectors in a local neighborhood.

8. The method of claim 3 wherein the best matching motion vector is determined by a majority vote.

9. A method comprising:
   receiving a bitstream over a packet network representing a plurality of encoded images; and
   decoding said bitstream by determining an estimated motion vector of a lost packet.

10. The method of claim 9 wherein said estimated motion vector is determined by selecting a best matching motion vector representative of a plurality of motion vectors in an image region, said image region containing a subregion which corresponds to said lost packet.

11. The method of claim 9 wherein one of said plurality of motion vectors corresponding to said lost packet is set to zero vector.

12. The method of claim 9 wherein said best matching motion vector is determined by computing an average of said plurality of motion vectors in said image region.

13. The method of claim 9 wherein said best matching motion vector is determined by a majority vote.

14. A system comprising:
   a motion vector estimator that generates an estimate of a plurality of motion vectors based on at least one moving object;
   an encoder that encodes a plurality of images of said at least one moving object by constraining said plurality of motion vectors, said encoder generating a bitstream representing said plurality of images; and
   a transmission medium coupled to said encoder that transmits said bitstream over a packet network.

15. The system of claim 14 wherein said encoder further comprises:
   an encoding selector coupled to said motion vector estimator to select a best matching motion vector representative of said plurality of motion vectors; and
   a constraint coder coupled to said encoding selector to code said motion vectors to a set of constraint motion vectors.

16. The system of claim 15 wherein the best matching motion vector is selected by a majority voter.

17. A system comprising:
   a receiver that receives a bitstream representing a plurality of encoded images; and
   a decoder coupled to said receiver that decodes said bitstream using an estimated motion vector of a lost packet.

18. The system of claim 17 wherein said decoder further comprises:
   a decoding selector to select a best matching motion vector representative of a plurality of motion vectors in an image region containing at least a lost packet; and
   a lost vector generator coupled to said decoding selector to generate a constraint vector of said image region.

19. The system of claim 18 wherein the best matching motion vector is selected by a majority voter.

20. A motion estimator comprising:
   a motion vector estimator that generates an estimate of a plurality of motion vectors based on at least one moving object;
   a selector coupled to said motion vector estimator to select a best matching motion vector representative of said plurality of motion vectors; and
   a constraint coder coupled to said selector to code said plurality of motion vectors to a set of constraint motion vectors.

21. The motion estimator of claim 20 wherein the best matching motion vector is selected by a majority voter.

22. A motion compensator comprising:
   a selector to select a best matching motion vector in an image region containing a subregion which corresponds to a lost packet; and
   a generator coupled to said selector to generate an estimated motion vector corresponding to said lost packet.

23. The motion estimator of claim 22 wherein the best matching motion vector is selected by a majority voter.

* * * * *

UNITED STATES PATENT AND TRADEMARK OFFICE
CERTIFICATE OF CORRECTION

PATENT NO.   : 6,462,791 B1  Page 1 of 1
DATED        : October 8, 2002
INVENTOR(S)  : Zhu It is certified that error appears in the above-identified patent and that said Letters Patent is hereby corrected as shown below:

<u>Column 2,</u>
Line 17, delete "micro", insert -- macro --.

<u>Column 6,</u>
Line 1, delete "lose", insert -- loss --.

Signed and Sealed this

Twenty-ninth Day of April, 2003

JAMES E. ROGAN
*Director of the United States Patent and Trademark Office*